US009224251B2

(12) United States Patent
Harata et al.

(10) Patent No.: US 9,224,251 B2
(45) Date of Patent: Dec. 29, 2015

(54) GATEWAY DEVICE
(71) Applicant: DENSO CORPORATION, Kariya, Aichi-pref. (JP)
(72) Inventors: Yuzo Harata, Chiryu (JP); Mitsuyoshi Natsume, Hekinan (JP); Yasuyuki Takahashi, Okazaki (JP)
(73) Assignee: DENSO CORPORATION, Kariya (JP)
( * ) Notice: Subject to any disclaimer, the term of this patent is extended or adjusted under 35 U.S.C. 154(b) by 0 days.
(21) Appl. No.: 14/433,870
(22) PCT Filed: Oct. 4, 2013
(86) PCT No.: PCT/JP2013/005940
§ 371 (c)(1),
(2) Date: Apr. 7, 2015
(87) PCT Pub. No.: WO2014/057643
PCT Pub. Date: Apr. 17, 2014

(65) Prior Publication Data
US 2015/0254909 A1 Sep. 10, 2015

(30) Foreign Application Priority Data
Oct. 9, 2012 (JP) .................. 2012-224393

(51) Int. Cl.
G07C 5/08 (2006.01)
H04L 12/44 (2006.01)
(Continued)

(52) U.S. Cl.
CPC ............ G07C 5/008 (2013.01); G05B 23/0205 (2013.01); G05B 23/0216 (2013.01);
(Continued)

(58) Field of Classification Search
CPC ..... H04L 12/44; H04L 12/46; H04L 12/4625; H04L 69/28; H04L 2012/40273; G05B 23/0216; G05B 23/0205; G07C 2205/02; G07C 5/008; G07C 5/006; G07C 5/0808; G07C 5/0816; G07C 5/0858

USPC .......... 701/29.1, 31.4, 31.5, 32.7, 32.8, 33.2, 701/33.4, 33.7, 34.3, 34.4; 709/218; 702/182–185, 188
See application file for complete search history.

(56) References Cited

U.S. PATENT DOCUMENTS 5,908,455 A * 6/1999 Parvahan ................ B60T 8/885
                                                    701/32.7
6,212,449 B1 * 4/2001 Wellman .................. B66F 9/24
                                                    701/31.8
(Continued)

FOREIGN PATENT DOCUMENTS

JP    2003023440 A    1/2003
JP    2006191339 A    7/2006
(Continued)

OTHER PUBLICATIONS

U.S. Appl. No. 14/433,868, filed Apr. 7, 2015, Harata et al.
(Continued)

Primary Examiner — Russell Frejd
(74) Attorney, Agent, or Firm — Harness, Dickey & Pierce, P.L.C.

(57) ABSTRACT

A gateway device includes a request receiving portion, a request storage, a request conversion portion, a request transmitting portion, a response receiving portion, a response storage, a response conversion portion, and a response transmitting portion. When receiving, from a first diagnosis purpose tool, a diagnosis request for performing a malfunction diagnosis to an ECU equipped to a vehicle, the gateway device relays a diagnosis request and a diagnosis response between the first diagnosis purpose tool and the ECU. When receiving, from a second diagnosis purpose tool, a diagnosis request for performing a malfunction diagnosis to the ECU equipped to the vehicle, the gateway device relays a diagnosis request and a diagnosis response between the second diagnosis purpose tool and the ECU after converting identification informations of the diagnosis request and the diagnosis response.

10 Claims, 5 Drawing Sheets

(51) Int. Cl.
*H04L 12/46* (2006.01)
*G01M 17/00* (2006.01)
*G07C 5/00* (2006.01)
*H04L 29/06* (2006.01)
*G05B 23/02* (2006.01)
*H04L 12/40* (2006.01)

(52) U.S. Cl.
CPC .............. *G07C5/006* (2013.01); *G07C 5/0808* (2013.01); *G07C 5/0816* (2013.01); *G07C 5/0858* (2013.01); *H04L 12/44* (2013.01); *H04L 12/46* (2013.01); *H04L 12/4625* (2013.01); *H04L 69/28* (2013.01); *G07C 2205/02* (2013.01); *H04L 2012/40273* (2013.01)

(56) References Cited

U.S. PATENT DOCUMENTS

| | | | | |
|---|---|---|---|---|
| 2006/0106508 A1* | 5/2006 | Liebl | .................... | G07C 5/008 701/31.4 |
| 2007/0100520 A1* | 5/2007 | Shah | .................... | G07C 5/008 701/31.4 |
| 2008/0068144 A1 | 3/2008 | Sato | | |
| 2008/0201035 A1* | 8/2008 | Kondoh | ................... | F02D 41/22 701/31.4 |
| 2008/0266051 A1 | 10/2008 | Taki et al. | | |
| 2011/0125364 A1* | 5/2011 | Delcroix | ............ | G05B 23/0216 701/31.4 |
| 2011/0161104 A1* | 6/2011 | Gilbert | ................... | G06N 5/003 705/2 |
| 2011/0187513 A1 | 8/2011 | Taki et al. | | |

FOREIGN PATENT DOCUMENTS

| | | |
|---|---|---|
| JP | 2006193919 A | 7/2006 |
| JP | 2006197017 A | 7/2006 |
| JP | 2006347333 A | 12/2006 |
| JP | 2007196971 A | 8/2007 |
| JP | 2008074124 A | 4/2008 |
| JP | 2012105082 A | 5/2012 |
| WO | WO-2014057642 A1 | 4/2014 |

OTHER PUBLICATIONS

International Search Report and Written Opinion (in Japanese with English Translation) for PCT/JP2013/005940, mailed Jan. 14, 2014; ISA/JP.

International Search Report and Written Opinion (in Japanese with English Translation) for PCT/JP2013/005939, mailed Jan. 14, 2014; ISA/JP.

* cited by examiner

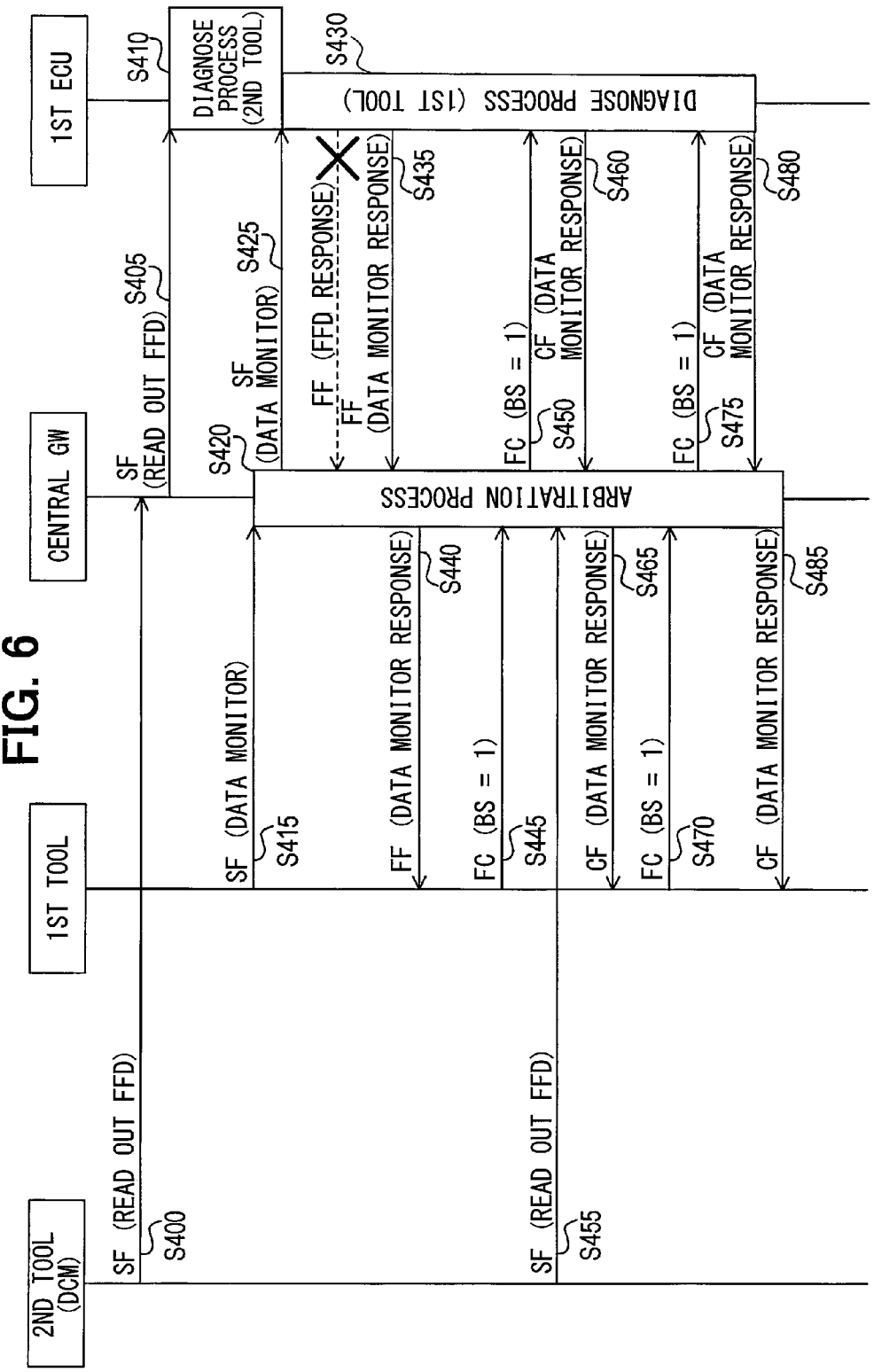

GATEWAY DEVICE

CROSS REFERENCE TO RELATED APPLICATION

This application is a U.S. National Phase Application under 35 U.S.C. 371 of International Application No. PCT/JP2013/005940 filed on Oct. 4, 2013 and published in Japanese as WO 2014/057643 A1 on Apr. 17, 2014. This application is based on and claims the benefit of priority from Japanese Patent Application No. 2012-224393 filed on Oct. 9, 2012. The entire disclosures of all of the above applications are incorporated herein by reference.

TECHNICAL FIELD

The present disclosure relates to a gateway device that relays a communication between a diagnosis purpose tool and an electronic control unit (ECU) to be diagnosed by the diagnose purpose tool.

BACKGROUND ART

Conventionally, a Controller Area Network (CAN) used in an on-board system is known as one of Local Area Network (LAN) communication standards. Usually, at a dealership utility, a malfunction diagnosis (diagnosis) for diagnosing an ECU included in an on-board system is performed by connecting a service tool to CAN of the vehicle using a data link connector.

As is well known, an ECU is able to wirelessly communicate with an external device. For example, an ECU that is communicable with a mobile device receives a remote operation via the mobile device, and functions as a remote operation device (refer to patent literature 1).

Further, an ECU, such as a Data Communication Module (DCM), is able to access to a wireless communication network and perform a wireless communication with an external remote tool positioned outside of the vehicle. The DCM performs a malfunction diagnosis to each of multiple ECUs that configure the on-board system using CAN of the vehicle.

Furthermore, it is well known that, in an on-board system, the diagnosis of the ECU can be carried out by both the service tool and the remote tool.

A data frame transmitted or received in CAN includes identification information (ID). The identification information has 11 bit (or 29 bit) data that indicate a priority of the data frame, use purpose, frame type, or the like. In International Organization for Standardization (ISO) communication protocol, the frame IDs (11 bits) from 0x700 to 0x7FF are defined as the diagnosis purpose frame ID.

As described above, in a communication protocol defined under each of various communication standards, only limited identification informations are used for diagnosis purpose frame. However, in the future, with a diversification of the diagnosis tools and an increase of the number of ECUs equipped to a vehicle, the available identification informations for diagnosis purpose may face a problem of depletion.

Further, each ECU needs to perform different processes according to a type of the received data frame. Thus, when the number of identification informations for diagnosis purpose increases with the diversification of the diagnosis tools, the diagnosis related process carried out by the ECU may become complicated.

PRIOR ART LITERATURES

Patent Literature

[Patent Literature 1] JP 2006-347333 A

SUMMARY OF INVENTION

In view of the foregoing difficulties, it is an object of the present disclosure to provide a gateway device that simplifies a diagnosis related process in an ECU and prevents a depletion of identification information having a predetermined use purpose for diagnosis.

According to a first aspect of the present disclosure, a gateway device includes a request receiving portion, a request storage, a request conversion portion, a request transmitting portion, a response receiving portion, a response storage, a response conversion portion, and a response transmitting portion. The request receiving portion receives, from a first diagnosis purpose tool, a diagnosis request that requests an execution of a malfunction diagnosis to an electronic control unit equipped to a vehicle. The request receiving portion further receives, from a second diagnosis purpose tool, a target diagnosis request that requests an execution of a malfunction diagnosis to the electronic control unit. The target diagnosis request has a first identification information, and the malfunction diagnosis requested by the target diagnosis request is identical to the malfunction diagnosis requested by the diagnosis request. The request storage stores a request conversion reference information that indicates a correspondence relation between the first identification information and a second identification information. The second identification information is different from the first identification information. The request conversion portion converts, based on the request conversion reference information, the first identification information, which is included in the target diagnosis request, to the corresponding second identification information. The request transmitting portion transmits the diagnosis request received by the request receiving portion to an in-vehicle local area network to which the electronic control unit is connected. The request transmitting portion further transmits the target diagnosis request to the in-vehicle local area network after the request conversion portion converts the first identification information to the second identification information. The response receiving portion receives a diagnosis response. The diagnosis response is output from the electronic control unit to the in-vehicle local area network as a response to the diagnosis request. The response storage stores a third identification information. The third identification information is an identification information of a diagnosis response, which is a response to the target diagnosis request. The response storage further stores a response conversion reference information that indicates a correspondence relation between the third identification information and a fourth identification information. The fourth identification information is different from the third identification information. The response conversion portion converts, based on the response conversion reference information, the third identification information, which is included in the diagnosis response to the target diagnosis request, to the corresponding fourth identification information. The response transmitting portion transmits, to the first diagnosis purpose tool, the diagnosis response to the diagnosis request. The diagnosis response is received by the response receiving portion and the first diagnosis purpose tool is a transmission source of the diagnosis request. The response transmitting portion further transmits, to the second diagnosis purpose tool, the diagnosis response to the target diagnosis request after the response conversion portion converts the third identification information of the diagnosis response to the fourth identification information. The second diagnosis purpose tool is a transmission source of the target diagnosis request.

With the above device, a diagnosis related process in an ECU can be simplified and a depletion of identification information having a specific use purpose for malfunction diagnosis can be prevented.

BRIEF DESCRIPTION OF DRAWINGS

The above and other objects, features and advantages of the present invention will become more apparent from the following detailed description made with reference to the accompanying drawings. In the drawings:

FIG. 6 is a flowchart showing a process in which arbitration is performed for giving a priority to a malfunction diagnosis requested by a first tool.

EMBODIMENTS FOR CARRYING OUT INVENTION

The following will describe embodiments of the present disclosure with reference to the drawings. In addition, specific embodiments of the present disclosure are not limited to the embodiments described below, and as long as the embodiment is within a technical scope of the present disclosure, any change or modification can be made to the embodiments of the present disclosure.

(Configuration)

Figure 1:
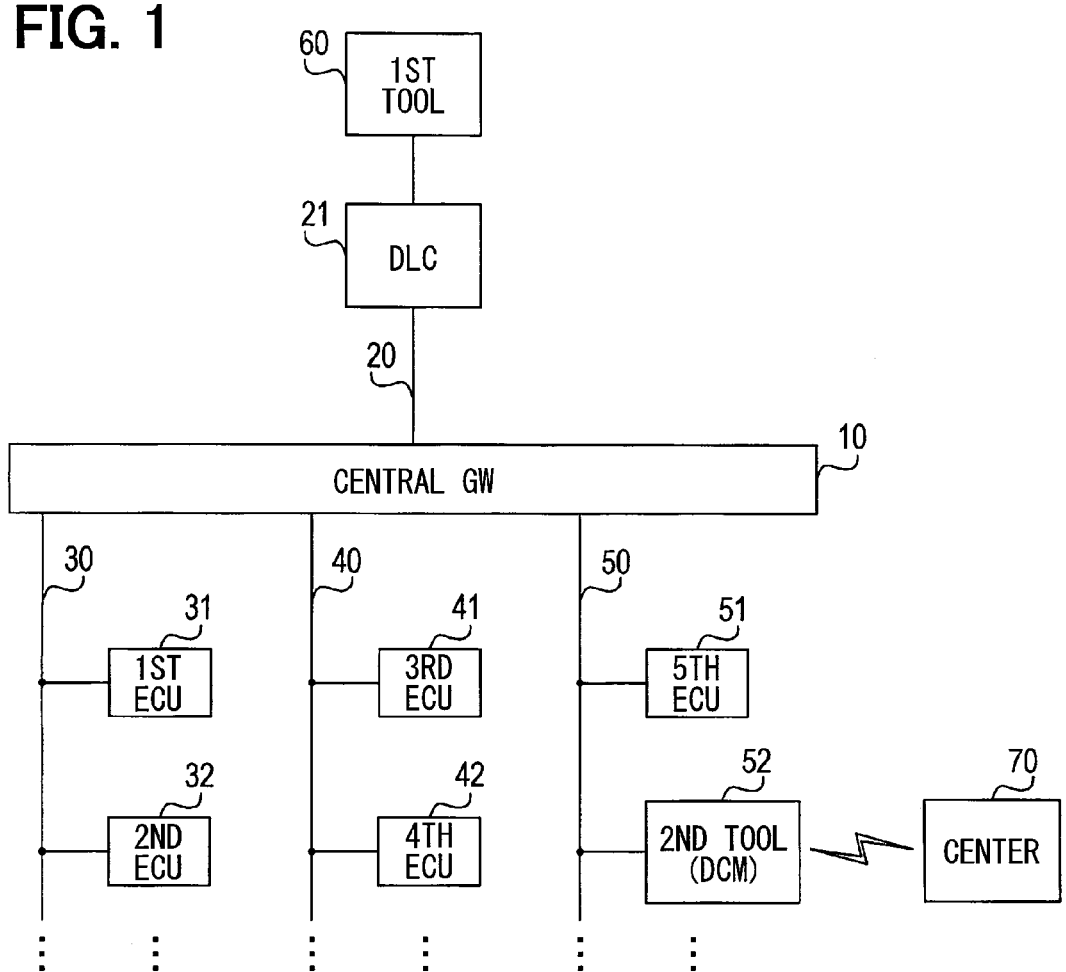
FIG. 1 is a block diagram showing a configuration of an on-board system including a gateway device according to an embodiment of the present disclosure.

FIG. 1 is a block diagram showing a configuration of an on-board system that includes a central gateway (CENTRAL GW) 10 and other components. The central gateway 10 is an example of a gateway device according to the present disclosure. Hereinafter, the central gateway 10 is described as central GW 10 for simplification.

The central GW 10 is connected to a first LAN (1ST LAN) 30, a second LAN (2ND LAN) 40, or the like. A first electronic control unit (1ST ECU) and a second electronic control unit (2ND ECU) 32 are connected to the first LAN 30, which is an in-vehicle LAN. A third electronic control unit (3RD ECU) 41 and a fourth electronic control unit (4RD ECU) 42 are connected to the second LAN 40, which is an in-vehicle LAN. The central GW 10 is also connected to a third LAN (3RD LAN) 50. A fifth electronic control unit (5TH ECU) 51 and a Data Communication Module (DCM) 52 that is able to access to a wireless communication network are connected to the third LAN 50, which is an in-vehicle LAN. The central GW 10 relays a communication between different ECUs that are connected to different LANs, respectively.

The central GW 10 may be configured as a gateway ECU, or may be configured as a specific purpose ECU that is used for a specific purpose, such as navigation or air conditioning.

In the present embodiment, each of the first LAN 30 to the third LAN 50 is configured as Controller Area Network (CAN) as an example. The LANs may also be provided by different networks configured based on communication protocols other than CAN.

For example, the central GW 10 may be connected to a transmission path 20, which is configured as CAN. A data link connector (DLC) 21 is positioned in the transmission path 20. To the data link connector 21, a first diagnosis purpose tool (1ST TOOL) 60 can be temporarily connected for performing a malfunction diagnosis to each ECU. Hereinafter, the first diagnosis purpose tool 60 is referred to as a first tool 60 for simplification. For example, the first tool 60 may be provided by a service tool at a dealership utility, an authorized tool determined under a law or under a regulation for performing the malfunction diagnosis, or the like.

The first tool 60 is connected to the data link connector 21, and starts the malfunction diagnosis of the ECU. At this time, the central GW 10, via the transmission path 20, receives a diagnosis request frame from the first tool 60, and transmits the received diagnosis request frame to the first to third LANs 30 to 50. The diagnosis request frame is a frame that instructs a malfunction diagnosis to one of the ECUs.

When one of the ECUs outputs, as a response to the diagnosis request frame, a diagnosis response frame to a corresponding LAN, which is one of the first to third LANs 30 to 50, the central GW 10 receives the diagnosis response frame and transmits the diagnosis response frame to the first tool 60 via the transmission path 20.

Thus, when the first tool 60 is connected to the data link connector 21, the first tool 60 is able to transmit or receive the diagnosis purpose frame to or from one of the ECUs included in the on-board system via the central GW 10. With this configuration, the first tool 60 is able to perform the malfunction diagnosis to each of the ECUs.

In the present disclosure, the DCM 52 is connected to the third LAN 50 and functions as a second diagnosis purpose tool (2ND TOOL). Hereinafter, the second diagnosis purpose tool 52 is referred to as a second tool 52 for simplification. The second tool 52 is communicably connected with a center (CENTER) 70 (may be provided by a mobile phone or a smart phone) via a wireless communication network. The center 70 performs a malfunction diagnosis to the ECUs of the vehicle. The second tool 52 outputs a diagnosis request frame to the third LAN 50 when the malfunction diagnosis is requested by the center 70 or when a predetermined activation condition is satisfied in the second tool 52. The central GW 10 receives the diagnosis request frame and converts the ID of the diagnosis request frame (will be described in detail later), and then, outputs the diagnosis request frame to the first to third LANs 30 to 50.

When a diagnosis response frame is output by one of the ECUs to one of the first to third LANs 30 to 50 as a response, the central GW 10 receives the diagnosis response frame. Then, the central GW 10 converts the ID of the diagnosis response frame (will be described in detail later), and outputs the diagnosis response frame to the third LAN 50. The second tool 52 receives the diagnosis response frame and transmits contents of the diagnosis response to the center 70.

As described above, the central GW 10 relays a transmission and receiving of the diagnosis purpose frame between the second tool 52 and the ECU that is a target of the malfunction diagnosis. Herein, the second tool 52 performs the malfunction diagnosis in response to the instruction from the center 70 or in response to a satisfaction of the predetermined activation condition in the second tool 52. With this configuration, the center (CENTER) 70 is able to communicate with the ECUs that configure the on-board system via the second tool 52 and the central GW 10, and is able to perform the malfunction diagnosis to the ECUs.

Figure 2:
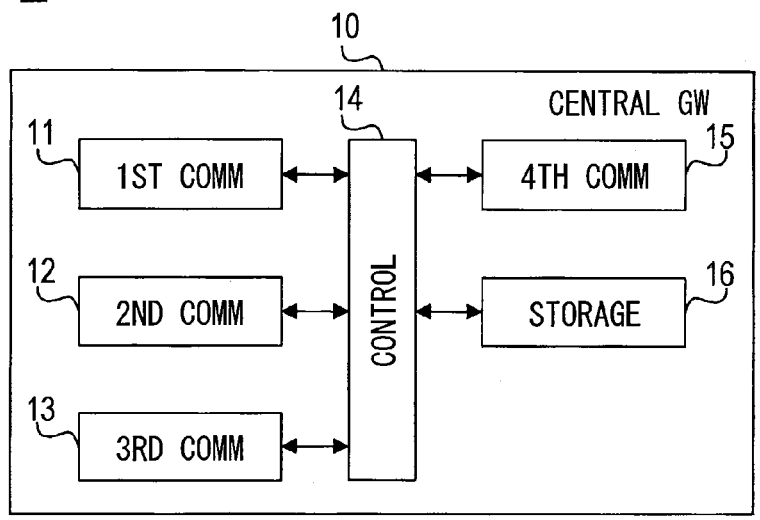
FIG. 2 is a block diagram showing a configuration of a central GW.

The following will describe a configuration of the central GW 10 with reference to FIG. 2. The central GW 10 includes a first communication portion (1ST COMM) 11 that performs a communication via the first LAN 30, a second communication portion (2ND COMM) 12 that performs a communication via the second LAN 40, a third communication portion (3RD COMM) 13 that performs a communication via the third LAN 50, and a fourth communication portion (4TH COMM) 15 that performs a communication via the transmission path 20. The central GW 10 further includes a controller (CONTROL) 14 and a storage (STORAGE) 16. The storage 16 is provided by a volatile memory device that does not maintain stored information (such as, flash memory).

The controller 14 is configured with a well-known microcomputer as a main part. As well known, the microcomputer includes a Central Processing Unit (CPU), a Read Only Memory (ROM), a Random Access Memory (RAM), an Input/Output (I/O) and a bus line connects these components. The controller 14 controls operations of the central GW 10 by executing programs stored in the ROM.

(Operations)

(1) Diagnosis Purpose Frame Relay

The following will describe a process executed by the central GW 10 for relaying the diagnosis purpose frame during the malfunction diagnosis.

The frame used in CAN includes ID having 11 bits of data indicating data priority (the higher priority corresponding to a smaller value of ID). The ID is defined corresponding to a type, a use purpose, a transmission source, a transmission destination of the frame.

Under ISO communication protocol, IDs having values from 0x700 to 0x7FF are defined to be used as diagnosis purpose frame IDs.

Each ECU included in the on-board system according to the present embodiment supports the malfunction diagnosis, which uses the frames having IDs from 0x700 to 0x7FF. When the first tool 60 performs the malfunction diagnosis to the ECU included in the on-board system, frames having above-described IDs are used for the malfunction diagnosis.

However, when the second tool 52 performs the malfunction diagnosis in response to the instruction from the center 70, frames having different IDs (for example, IDs from 0x000 to 0x6FF) are used other than above-described frames having IDs from 0x700 to 0x7FF in the second tool 52. Thus, when the central GW 10 relays a frame between the second tool 52 and one target ECU, the central GW 10 needs to convert the ID of the frame transmitted from the second tool 52 so that the ID is within a range from 0x700 to 0x7FF and indicates the same type and use purpose with the frame transmitted from the second tool 52. As described above, the ID range from 0x700 to 0x7FF are used in the malfunction diagnosis by the first tool 60.

Figure 3:
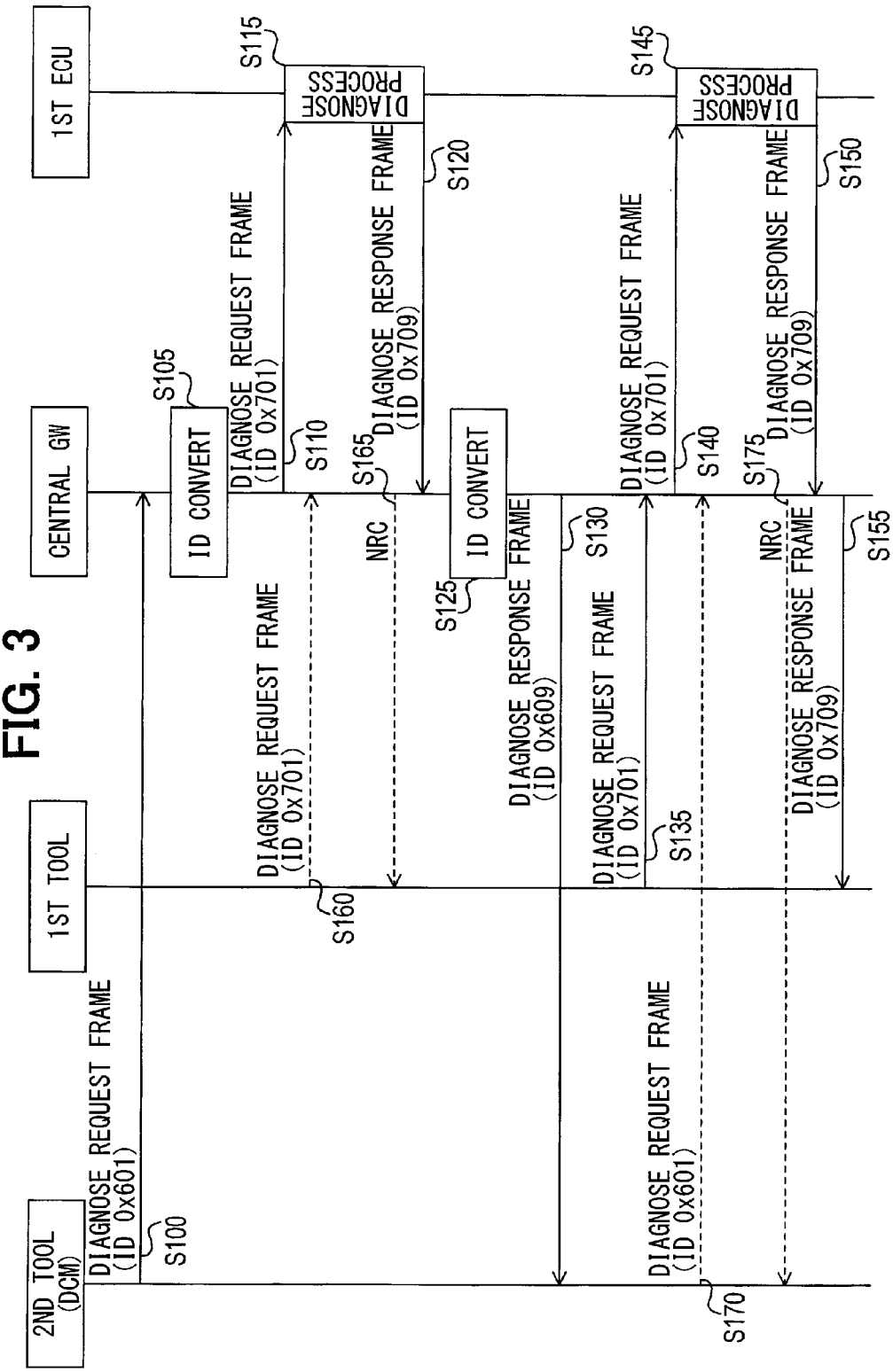
FIG. 3 is a flowchart showing a process for relaying a diagnosis purpose frame.

The following will describe a process executed by the central GW 10 for relaying the diagnosis purpose frame with reference to FIG. 3.

In response to the instruction from the center 70 or in response to a satisfaction of the predetermined activation condition, the second tool 52 outputs, to the third LAN 50, a diagnosis request frame (having ID of 0x601) (S100). Herein, the diagnosis request frame instructs a diagnosis process for performing a malfunction diagnosis to any one of the ECUs.

The controller 14 of the central GW 10 receives the diagnosis request frame from the second tool 52 via the third communication portion 13.

The diagnosis request frame may be an instruction (data monitoring) for reading out data stored in a predetermined address range of a memory of the ECU to be diagnosed. As another example, the diagnosis request frame may be a request for transmitting freeze frame data (FFD) that indicates a vehicle state when a malfunction occurs to the vehicle. The FFD indicating the vehicle state may include a vehicle speed, an engine speed, or the like.

The controller 14 of the central GW 10 converts ID of the received diagnosis request frame to 0x701 based on conversion reference information stored in the storage 16 (S105).

The conversion reference information is an information that indicates correspondence relations between IDs (0x000 to 0x6FF) used in the second tool 52 and IDs (0x700 to 0x7FF) used in the first tool 60. Herein, the correspondence relations are defined based on the type and use purpose of ID. That is, an ID used in the second tool 52 is correlated to an ID used in the first tool 60 when the two IDs have the same ID type and use purpose. Based on the conversion reference information, the ID of the diagnosis purpose frame used in the second tool 52 is converted to the ID of the diagnosis purpose frame used in the first tool 60 (the ID defined based on the communication protocol standard).

At S110, the controller 14 of the central GW 10 outputs the diagnosis request frame having the converted ID to the first to third LANs 30 to 50 via the first to third communication portions 11 to 13.

For example, when the first ECU 31 receives the diagnosis request frame, the first ECU 31 performs the diagnosis process (S115) in response to the diagnosis request frame. Then, the first ECU 31 generates a diagnosis response frame (having ID of 0x709) as a response to the diagnosis request, and outputs the diagnosis response frame to the first LAN 30 (S120).

The controller 14 of the central GW 10 receives the diagnosis response frame via the first communication portion 11, and converts the ID of the diagnosis response frame to 0x609 based on the conversion reference information stored in the storage 16 (S125).

At S130, the controller 14 of the central GW 10 outputs the diagnosis response frame having the converted ID to the third LAN 50 via the third communication portion 13. Then, the second tool 52 receives the diagnosis response frame having the converted ID. With the above-described configuration, the transmitting and receiving of the diagnosis purpose frames between the second tool 52 and the first ECU 31 are achieved.

After the diagnosis requested by the second tool 52 is ended, when the first tool 60 outputs the diagnosis request frame (having ID of 0x701) to the transmission path 20 (S135), the controller 14 of the central GW 10 receives the diagnosis request frame via the fourth communication portion 15. Then, the controller 14 of the central GW 10 outputs the diagnosis request frame to the first to third LANs 30 to 50 (S140).

When the ECU 31 receives the diagnosis request frame, the ECU 31 performs a diagnosis process in response to the diagnosis request frame (S145), and generates a diagnosis response frame (having ID of 0x709). Then, the ECU 31 outputs the diagnosis response frame to the first LAN 30 (S150).

The controller 14 of the central GW 10 receives the diagnosis response frame that is output to the first LAN 30 by the first ECU 31, and outputs the diagnosis response frame to the transmission path 20 via the fourth communication portion

15. Then, the first tool 60 receives the diagnosis response frame. With the above-described configuration, the transmitting and receiving of the diagnosis purpose frames between the first tool 60 and the first ECU 31 are achieved.

As described above, the central GW 10 receives the diagnosis request frame from the second tool 52, converts the ID of the diagnosis request frame, and relays the diagnosis request frame. After the relay of the diagnosis request frame transmitted from the second tool 52, during a period for waiting the response to the diagnosis request frame, suppose that the central GW 10 receives, from the first tool 60, a diagnosis request frame having an ID identical to the ID (converted ID) of the diagnosis request frame transmitted from the second tool 52.

In the above case, suppose that the central GW 10 relays the diagnosis request frame from the first tool 60. In this case, the central GW 10 cannot identify a destination of a diagnosis response frame when receiving the diagnosis response frame from the target ECU. Herein, the destination of the diagnosis response frame may be the first tool 60 or the second tool 52.

Thus, when the controller 14 of the central GW outputs the diagnosis request frame from the second tool 52 at a previous time (S115) and receives the diagnosis request frame having the ID of 0x701 from the first tool 60 (S160) during a waiting period for the diagnosis response frame to the diagnosis request frame transmitted from the second tool 52 at the previous time (S120), the central GW 10 transmits a negative response code (NRC) to the first tool 60 (S165). The NRC is an instruction for resending the same frame after an elapse of a predetermined period.

After the relay of the diagnosis request frame from the first tool 60, during a period for waiting for the response to the diagnosis request frame from the first tool 60, suppose that the central GW 10 receives, from the second tool 52, a new diagnosis request frame having an ID (converted ID) identical to the ID of the diagnosis request frame transmitted from the first tool 60 and the diagnosis request from the second tool is relayed by the central GW 10.

In the above case, if the central GW 10 converts the ID of the diagnosis request frame from the second tool 52 and relays the diagnosis request frame from the second tool 52 to the ECU, the central GW 10 cannot identify a destination of a diagnosis response frame when receiving the diagnosis response frame from the ECU. Herein, the destination of the diagnosis response frame may be the first tool 60 or the second tool 52.

Thus, when the controller 14 of the central GW outputs the diagnosis request frame from the first tool 60 at a previous time (S140) and receives the diagnosis request frame having the ID of 0x601 from the second tool 52 (S170) during a waiting period for the diagnosis response frame to the diagnosis request frame transmitted from the first tool 60 at the previous time (S150), the central GW 10 transmits a negative response code (NRC) to the second tool 52 (S175). The NRC is an instruction for resending the same frame after an elapse of a predetermined period.

With above-described configuration, a response to the diagnosis request frame that has been relayed at a previous time can be relayed to the transmission source of the corresponding diagnosis request frame with a high reliability, and a response to the diagnosis request frame that has been relayed at a later time can be relayed to the transmission source of the corresponding diagnosis request frame with a high reliability.

Suppose that the first ECU 31 is configured to process tasks based on a first come first processed rule (will be described in detail later). In this case, when the first ECU 31 receives a new diagnosis request frame from a different diagnosis tool during a diagnosis process related to a prior diagnosis request frame (S115, S145) from one diagnosis tool, the first ECU 31 refuses to receive the new diagnosis request frame and transmits NRC as a response.

In the above-described case, the central GW 10 may relay the diagnosis request frame received at S160 or S170 to the target ECU. When the central GW 10 receives NRC from the target ECU as a response to the diagnosis request frame, the central GW 10 may relay the NRC to the transmission source of the diagnosis request frame. With this configuration, the first tool 60 and the second tool 52 can receive the resending instructions. Herein, the resending instruction requests for a resending of the diagnosis request frame.

With the above-described central GW 10, the center 70 can perform the malfunction diagnosis to each ECU even though each ECU does not support IDs that are used in the second tool 52. Herein, IDs used in the second tool are different from IDs used in the first tool 60. That is, a diagnosis related process in each ECU can be simplified without considering the malfunction diagnosis performed by the second tool 52. As described above, the second tool 52 uses diagnosis IDs that are different from the diagnosis IDs used in the first tool 60.

With the above-described central GW 10, each ECU can support the malfunction diagnosis requested by the second tool 52 without changing a configuration, and IDs for diagnosis purpose can be used without any waste. Thus, increasing needs of diagnosis purpose IDs used in the first tool 60 corresponding to the increase of the number of the ECUs can be satisfied. Further, when the number of IDs for diagnosis purpose increases with an increase of the number of diagnosis tools, such as the second tool 52, the increasing needs for the diagnosis purpose IDs can be satisfied by using IDs that are different from the IDs defined for diagnosis purpose frame under the predetermined communication protocol. With the above configuration, a depletion of IDs used in the diagnosis purpose frame can be suppressed. Herein, the IDs used in the diagnosis purpose frame are defined under a predetermined communication protocol.

By using the above-described central GW 10, in each ECU, IDs used in the diagnosis purpose frame can be freely set within a range defined under the communication protocol without considering the malfunction diagnosis requested by the second tool 52. Further, when a new diagnosis tool different from the second tool 52 is added or is changed, and accordingly, IDs for the diagnosis purpose, which are different from the IDs of the diagnosis purpose frame defined under the communication protocol, are changed, the IDs used in the diagnosis purpose frame in each ECU has no need to be changed.

Further, an existing ECU usually supports the malfunction diagnosis performed by the first tool 60 (the malfunction diagnosis using the IDs defined under the communication protocol). However, the existing ECU may not support the malfunction diagnosis performed by the second tool 52 (the malfunction diagnosis using IDs different from the IDs defined under the communication protocol).

In the above-described case, the central GW 10 converts the IDs used in the diagnosis purpose frame of the second tool 52 to the IDs used in the diagnosis purpose frame of the first tool 60.

Thus, the second tool 52 is also able to perform the malfunction diagnosis to the ECU, and the ECU can be continuously used in the on-board system without any change. Further, when a new diagnosis tool other than the second tool 52 is used for diagnosing the ECU, the existing diagnosis related process in the ECU can be used without any change for the malfunction diagnosis requested by the new diagnosis tool.

(2) Arbitration

The following will describe an arbitration process executed by the central GW 10 when giving a higher priority to the malfunction diagnosis requested by the first tool 60 compared with the malfunction diagnosis requested by the second tool 52.

In CAN, the maximum data length which can be transmitted in one frame is 8 bytes. When the size of the data to be transmitted by CAN exceeds 8 bytes, the data needs to be divided and transmitted in two or more frames by twice or more times in order to transmit the data as a message.

ISO 15765 standard defines four types of frames including a single frame (SF), a first frame (FF), a consecutive frame (CF), a flow control frame (FC), and also defines time limits related to transmitting or receiving of the frame between the diagnosis tool and the ECU.

Further, ISO 14229 defines a communication protocol of an application layer of CAN. In this communication protocol, if an ECU receives a new frame during a receiving of one frame or a message (hereinafter, described as frame and so on), the ECU, under a specific rule, ignores the newly inputted frame, and gives a priority to the frame being currently received (first come first processed). That is, the ECU performs process related to the frame received at a previous time before the process related to the frame inputted at a later time.

ISO 15765 defines a communication protocol of a network layer of CAN. In this communication protocol, during a receiving of the data having a size larger than 8 bytes, the ECU, under a specific rule, cancels a receiving of the data when SF or FF is destined to the ECU, and receives the SF or FF with a higher priority (after come first processed).

Suppose that the application layer of the ECU in the present embodiment has the first come first processed configuration and the second tool 52 is transmitting or receiving diagnosis data to or from one of the ECUs through the central GW 10. At this time, when the first tool 60 transmits a new diagnosis request frame to the same ECU, the frame is refused by the ECU and the malfunction diagnosis requested by the first tool 60 cannot be started.

The first tool 60 is usually provided a diagnosis service tool used in a dealership utility. Thus, when the malfunction diagnosis requested by the first tool 60 is refused by the ECU and cannot be started, other customers who has applied for a diagnosis service of a vehicle have to wait in the dealership utility.

In order to solve above problem, the central GW 10 performs the arbitration when the malfunction diagnosis is requested by the first tool 60 during a data transceiving for the malfunction diagnosis between the second tool 52 and the ECU. Then, the central GW 10 interrupts the malfunction diagnosis being performed by the second tool 52, and controls the ECU to receive the malfunction diagnosis requested by the first tool 60.

Figure 4:
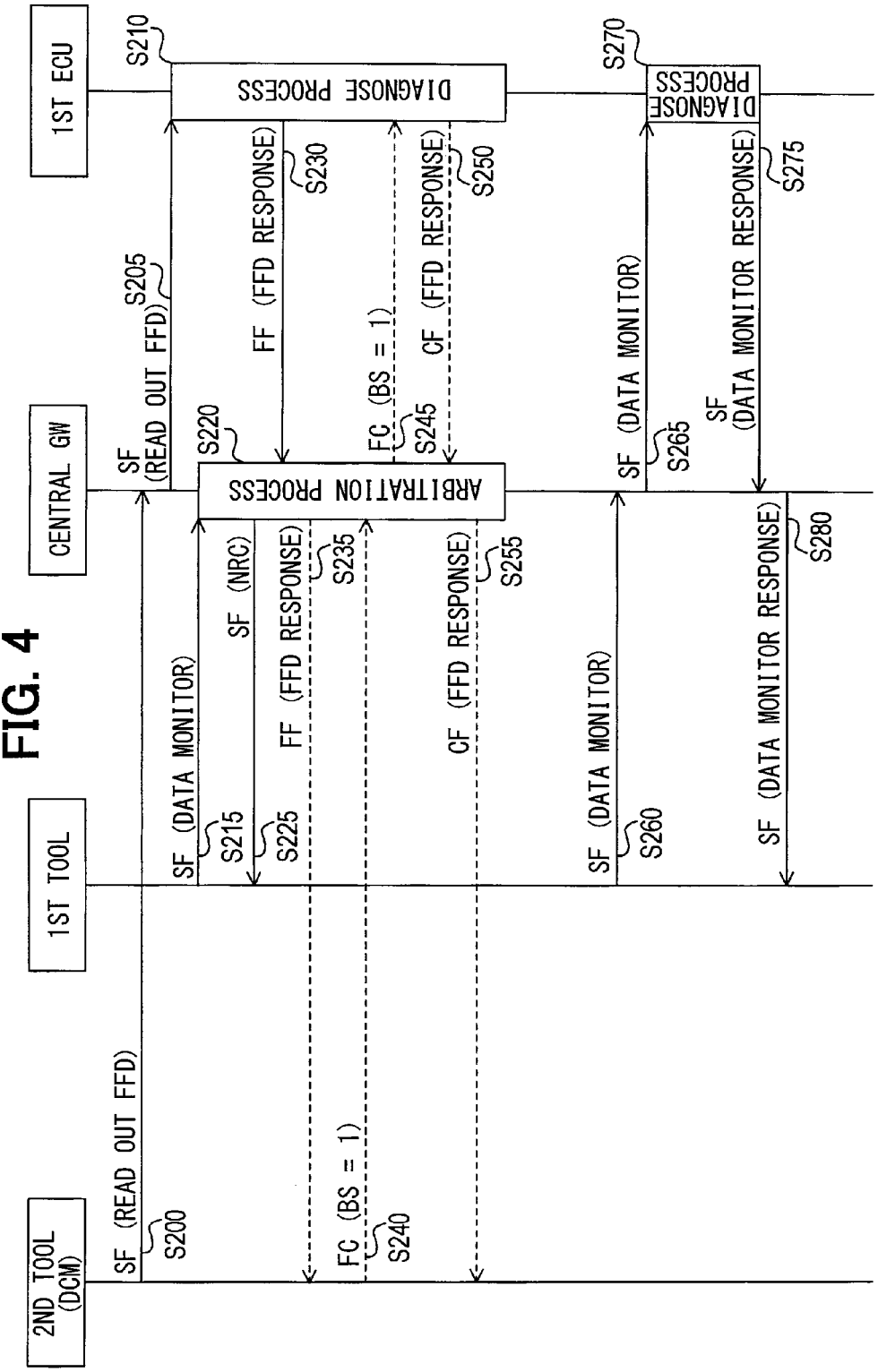
FIG. 4 is a flowchart showing a process in which arbitration is performed for giving a priority to a malfunction diagnosis requested by a first tool.

The following will describe an arbitration process for giving a higher priority to the malfunction diagnosis requested by the first tool 60 with reference to FIG. 4.

The second tool 52 outputs, to the third LAN 50, an SF that requests the first ECU 31 to provide an FFD (S200). That is, the SF is equal to an FFD readout command. The controller 14 of the central GW 10 receives the FFD readout command via the third communication portion 13.

The IDs from 0x000 to 0x6FF are used for the FFD readout command. The controller 14 of the central GW 10 converts, based on the conversion reference information stored in the storage 16, the ID of the received FFD readout command.

Then, the central GW 10 outputs the FFD readout command having the converted ID to the first to third LANs 30 to 50 (S205).

When the first ECU 31 receives the FFD readout command, the first ECU 31 starts the diagnosis process (S210), and reads out the FFD stored in a flash memory of the first ECU 31. When the FFD has a data size larger than 8 bytes, the FFD is divided into multiple data segments each of which having a data size less than 8 bytes.

Then, the first ECU 31 generates an FF. Herein, FF corresponds to an FFD response that includes one divided data segment of the FFD data. Then, the first ECU 31 outputs the FFD response to the first LAN 30 (S230). The controller 14 of the central GW 10 receives the FFD response via the first communication portion 11.

Suppose that, after the central GW 10 outputs the FFD readout command to the first ECU 31 at S205, the first tool 60 outputs, to the transmission path 20, an SF of data monitoring command that instructs readout data stored in a predetermined address of the memory of the first ECU 31 (S215).

Suppose that the controller 14 of the central GW 10 receives the data monitoring command from the first tool 60 before the receiving of the FFD response from the first ECU 31. Thus, in response to a receiving of the data monitoring command from the first tool 60, the central GW 10 performs an arbitration process for a predetermined period in order to interrupt the malfunction diagnosis being performed the second tool 52 and start the malfunction diagnosis requested by the first tool 60 with a higher priority (S220).

During the arbitration process, the central GW 10 cancels a relay of the diagnosis purpose frames used for the diagnosis requested by the second tool 52 (a relay of the diagnosis purpose frame between the first ECU 31 and the second tool 52). Thus, the FFD response output from the first ECU 31 (S230) is not relayed to the second tool 52.

In the arbitration process, as a response to the data monitoring command from the first tool 60, the controller 14 transmits, to the first tool 60, an SF of NRC that instructs a resending of the data monitoring command after an elapse of a predetermined time period (S225).

As described above, the first ECU 31 has the first come first processed configuration. Thus, when the first ECU 31 receives a new diagnosis request frame during a performing of a process related to the previously received diagnosis request frame, the first ECU 31, for example, outputs an SF (NRC) that instructs resending of the new diagnosis request frame as a response, and refuses to receive the new diagnosis request frame.

In some cases, the first ECU 31 cannot receive the diagnosis request frame while performing other processes. As described above, when the ID included in the diagnosis request frame received by the first ECU 31 at a previous time is identical to the ID included in the diagnosis request frame received by the first ECU 31 at a later time, the central GW 10 cannot determine a relay destination of the diagnosis response frame after receiving the diagnosis response from the first ECU 31. Herein, the relay destination is one of the first tool 60 or the second tool 52. Thus, the central GW 10 may fail to relay the newly received diagnosis request frame.

In the above-described case, the central GW 10 voluntarily transmits the NRC (S225) in order to instruct the first tool 60 to wait for a predetermined time period and resend the data monitoring command after an elapse of the predetermined time period. Then, the central GW 10 interrupts the process of the second tool 52 in order that the first ECU 31 is able to receive the request from the first tool 60.

When the ID included in the diagnosis request frame transmitted from the first tool 60 and received by the first ECU 31 is different from the ID (converted ID) of the diagnosis request frame transmitted from the second tool 52 and received by the first ECU 31, the central GW 10 may relay the data monitoring command transmitted from the first tool 60 to the first ECU 31 and relay the NRC output from the first ECU 31 to the first tool 60 as the response to the data monitoring command. In this case, since the IDs of frames relayed by the central GW 10 are different from one another, the resending commands can be transmitted to the first tool 60 for instructing the first tool 60 to resend the data monitoring command after an elapse of the predetermined time period.

The following will describe a method for interrupting a process executed by the second tool 52 during the arbitration process.

Before a description of the interruption method, a process executed by the central GW 10, the second tool 52, and the first ECU 31 will be described first (processes corresponding to dashed line arrows in FIG. 4). This process is executed when the arbitration process is not performed by the central GW 10.

When the controller 14 of the central GW 10 receives the FFD response, which is output from the first ECU 31 to the first LAN 30, the controller 14 converts the ID of the FFD response (0x700 to 0x7FF) based on the conversion reference information. Then, the controller 14 transmits the FFD response having the converted ID to the third LAN 50 via the third communication portion 13 (S235).

When the second tool 52 receives the FFD response, the second tool 52 outputs an FC that defines a transmission order of the FFD response to the third LAN 50 (S240). In the present embodiment, as one example of the FC, block size is set equal to 1, that is, block size (BS)=1, and the first ECU 31 is instructed to transmit one FFD response frame corresponding to the FC. However, the transmission order is not limited to this order.

When the controller 14 of the central GW 10 receives, via the third communication portion 13, the FC, which is output to the third LAN 50 from the second tool 52, the controller 14 converts the ID (0x000 to 0x6FF) of the FC based on the conversion reference information. Then, the controller 14 outputs, via the first to third communication portions 11 to 13, the FC having converted ID to the first to third LANs 30 to 50 (S245).

When the first ECU 31 receives the FC, the first ECU 31 outputs the FFD response to the first LAN 30 as a response (S250). Then, the controller 14 of the central GW 10 receives the FFD response via the first communication portion 11. Then, the controller 14 of the central GW 10 converts, based on the conversion reference information, the ID (0x700 to 0x7FF) of the FFD response, and outputs the FFD response having the converted ID to the third LAN 50 via the third communication portion 13 (S255).

The following will describe the arbitration process. When the central GW 10 performs the arbitration process in response to a receiving of the data monitoring command from the first tool 60 (S215), the first ECU 31 does not relay the FFD response transmitted from the first ECU 31 (S230). Thus, processes of S235 to S255 are not carried out by the central GW 10 when the central GW 10 performs the arbitration process.

Further, suppose that the central GW 10 starts the arbitration process in response to a receiving of the data monitoring command from the first tool 60 after transmitting of the FFD response to the second tool 52 (S235). Herein, the FFD response is transmitted from the first ECU (S230) as a response to the FFD readout command requested by the second tool 52. In this case, since the central GW 10 is performing the arbitration process, the central GW 10 does not relay the FC transmitted from the second tool 52 when receiving the FC from the second tool 52 at S240.

Further, suppose that the central GW 10 starts the arbitration process in response to a receiving of the data monitoring command from the first tool 60 after relaying the FC from the second tool 52 to the first ECU 31 (S245). In this case, the first ECU 31 outputs the FFD response at S250 in response to the FC. However, since the central GW 10 is performing the arbitration process, the central GW 10 does not relay the FFD response, which is output from the first ECU 31 at S250, to the second tool 52.

The second tool 52 waits for the FFD response after transmitting the FFD readout command (S200), and ends the malfunction diagnosis after an elapse of predetermined time period from outputting of the FFD readout command (S200). In a case where the second tool 52 outputs FC to the first ECU 31, the second tool 52 ends the malfunction diagnosis after an elapse of predetermined time period from outputting of FC at S240. The first ECU 31 waits for the FC, and ends the diagnosis process after an elapse of the predetermined time period from outputting of the FFD response (S230) or from outputting of the FFD response at S250.

The first tool 60 outputs the data monitoring command again to the transmission path 20 (S260) after an elapse of the predetermined time period from the receiving of the NRC from the central GW 10. The controller 14 of the central GW 10 receives the data monitoring command, and outputs the data monitoring command to the first to third LANs 30 to 50 (S265).

When the first ECU 31 receives the data monitoring command, the first ECU 31 starts the diagnosis process (S270), and reads out information stored in the memory specified based on the data monitoring command. Then, the first ECU 31 generates an SF of data monitoring response including readout data, and outputs the data monitoring response to the first LAN 30 (S275). The controller 14 of the central GW 10 receives the data monitoring response that is output to the first LAN 30, and outputs the data monitoring response to the transmission path 20 (S280) in order to relay the data monitoring response to the first tool 60.

By using the above-described central GW 10, when the first tool 60 sends a malfunction diagnosis request to the ECU while the second tool 52 is performing the malfunction diagnosis to the same ECU, the malfunction diagnosis being performed by the second tool 52 is interrupted in order to start the malfunction diagnosis requested by the first tool 60 with a higher priority. With this configuration, the malfunction diagnosis by the first tool 60 can be given a higher priority without performing arbitration in each ECU (in other words, a higher priority can be given to the first tool 60 without changing a process priority order defined in each of the multiple ECUs).

Thus, in the dealership utility, an execution of the malfunction diagnosis requested by the service tool can be secured without a delay. Further, an increase in processing load of each ECU and a complication of the processing in each ECU can be avoided by properly arbitrating the malfunction diagnosis requested multiple diagnosis tools.

Further, by the ID conversion performed by the central GW 10, the diagnosis purpose frame having the IDs defined under the communication protocol are transmitted between the central GW 10 and a target ECU of the malfunction diagnosis regardless of whether the diagnosis is requested by the first tool 60 or by the second tool 52.

Accordingly, when the malfunction diagnosis requested by the first tool 60 and the malfunction diagnosis requested by the second tool 52 are simultaneously carried out to the same target ECU and the central GW 10 relays the diagnosis purpose frame from each tool to the target ECU at the same time, the central GW 10 cannot determine a destination of the diagnosis response frame when receiving the diagnosis response frame from the target ECU of the malfunction diagnosis.

In the above case, the central GW 10 performs the arbitration process in order to give a higher priority to the malfunction diagnosis requested by the first tool 60. Thus, a simultaneous execution of the malfunction diagnosis requested by the first tool 60 with the execution of the malfunction diagnosis requested by the second tool 52 can be avoided. Accordingly, an increase of processing load of each ECU is avoided and a complication of the processing is avoided. With this configuration, a situation in which the central GW 10 cannot determine the destination of the diagnosis response frame can be avoided, and an occurrence of a processing abnormality can be avoided. Herein, the diagnosis response frame is transmitted from the target ECU of the malfunction diagnosis.

In the present embodiment, an example in which the arbitration process is carried out in order to give a higher priority to the malfunction diagnosis requested by the first tool 60 is described. As another example, when a malfunction diagnosis having a priority higher than the malfunction diagnosis of the second tool 52 is requested, the malfunction diagnosis having the higher priority can be processed before the malfunction diagnosis by the second tool 52. With this configuration, the malfunction diagnosis having the higher priority can be promptly carried out without a delay.

(First Modification)

Figure 5:
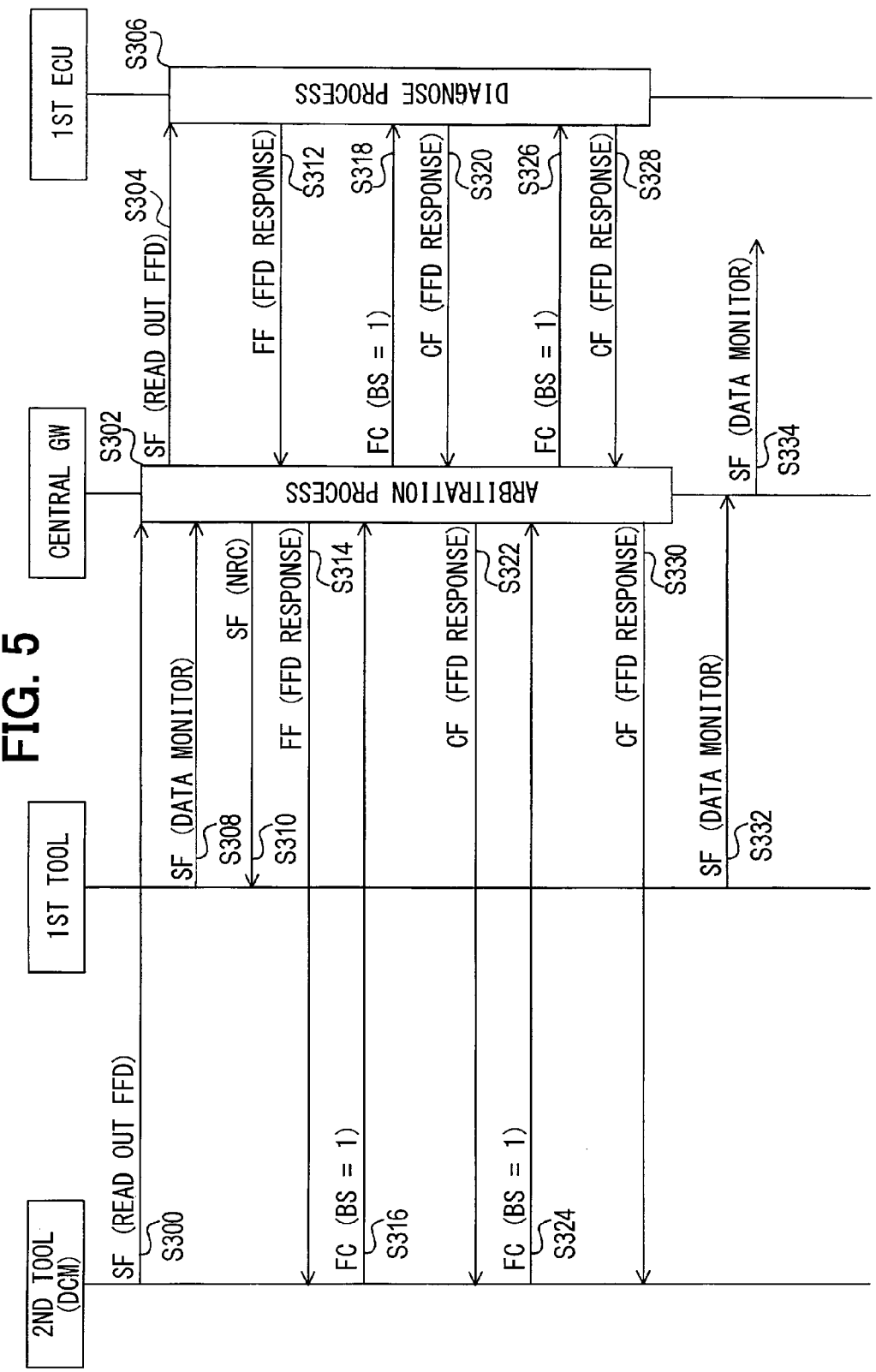
FIG. 5 is a flowchart showing a process in which arbitration is performed for avoiding that a malfunction diagnosis requested by a first tool and a malfunction diagnosis requested by a second tool are carried out at the same time.

When the malfunction diagnosis requested by the first tool 60 and the malfunction diagnosis requested by the second tool 52 are carried out at the same time, there is a difficulty in determining the destination of the response frame received from the target ECU of the malfunction diagnosis. Herein, the destination of the response frame is one of the first tool 60 or the second tool 52. Thus, the central GW 10 performs the arbitration process, and avoids the concurrent execution of the malfunction diagnosis by both the first tool 60 and the second tool 52. The following will describe an example of the arbitration process with reference to FIG. 5.

The second tool 52 outputs, to the third LAN 50, the FFD readout command that is destined to the first ECU 31 (S300). The controller 14 of the central GW 10 receives the FFD readout command via the third communication portion 13.

In response to the receiving of the FFD readout command transmitted from the second tool 52, the controller 14 of the central GW 10 starts the arbitration process in order to avoid the concurrent execution of the malfunction diagnosis by both the first tool 60 and the second tool 52 (S302). The controller 14 of the central GW 10 outputs the FFD readout command to the first to third LANs 30 to 50 after converting the ID of the received FFD readout command (S304).

When the first ECU 31 receives the FFD readout command, the first ECU 31 starts the diagnosis process (S306), and reads out the FFD stored in the non-volatile memory of the first ECU 31. When the FFD has a data size larger than 8 bytes, the FFD is divided into multiple data segments each of which having a data size less than 8 bytes.

Then, the first ECU 31 generates an FF. Herein, FF corresponds to an FFD response that includes one divided segment of the FFD. Then, the first ECU 31 outputs the FFD response to the first LAN 30 (S312). The controller 14 of the central GW 10 receives the FFD response via the first communication portion 11.

Suppose that, after the central GW 10 outputs the FFD readout command at S304, the first tool 60 outputs, to the transmission path 20, a data monitoring command to the same target ECU (S308).

The controller 14 of the central GW 10 receives the data monitoring command before receiving the FFD response from the first ECU 31. In response to the data monitoring command, the controller 14 of the central GW 10 outputs, to the transmission path 20, an SF of NRC that instructs a resending of the data monitoring command after an elapse of the predetermined time period (S310).

Then, the controller 14 of the central GW 10 receives the FFD response from the first ECU 31. Then, the controller 14 of the central GW 10 converts the ID of the FFD response based on the conversion reference information, and outputs, to the third LAN 50, the FFD response having the converted ID (S314).

The second tool 52 outputs, to the third LAN 50, an FC that instructs a transmission of the subsequent FFD response (S316) after receiving the FFD response at S314. The controller 14 of the central GW 10 receives the FC via the third communication portion 13, and converts the ID of the FC based on the conversion reference information, and outputs the FC having the converted ID to the first to third LANs 30 to 50 (S318).

When the first ECU 31 receives the FC, the first ECU generates a CF of FFD response including the next data segment of FFD, and outputs the FFD response to the first LAN 30 (S320). Then, the controller 14 of the central GW 10 receives the FFD response via the first communication portion 11.

The controller 14 of the central GW 10 that has received the FFD response converts the ID of the FFD response, and outputs the FFD response having the converted ID to the third LAN 50 (S322).

The second tool 52 receives the FFD response, and outputs the FC to the third LAN 50 (S324). When the controller 14 of the central GW 10 receives the FC via the third communication portion 13, the controller 14 of the central GW 10 converts the ID of the FC, and outputs the FC having the converted ID to the first to third LANs 30 to 50 (S326).

When receiving the FC, the first ECU 31 generates a CF. Herein, CF corresponds to an FFD response that includes next data segment of FFD. Then, the first ECU 31 outputs the FFD response to the first LAN 30 (S328). The controller 14 of the central GW 10 receives the FFD response via the first communication portion 11. In addition, since transmitting of FFD is completed by outputting the FFD response at S328, the diagnosis of the first ECU 31 requested by the second tool 52 is ended.

When the controller 14 of the central GW 10 receives the FFD response, the controller 14 converts the ID of the FFD response and outputs the FFD response having the converted ID to the third LAN 50 (S330). When the second tool 52 receives the FFD response, the second tool 52 generates an entire FFD based on all of the FFD response frames that have been received, and transmits the FFD to the center 70 using the wireless communication network.

When the predetermined time period has elapsed after the first tool 60 received the NRC from the central GW 10, the first tool 60 outputs the data monitoring command again to the transmission path 20 (S332). The controller 14 of the central GW 10 receives the data monitoring command that is output to the transmission path 20, and relays the data monitoring command to the first to third LANs 30 to 50 (S334).

Then, the target ECU, which is the destination of the data monitoring command, starts the diagnosis process in response to the data monitoring command. Then, the central GW 10 relays the diagnosis purpose frames between the target ECU and the first tool 60.

At S332, when the central GW 10 receives the data monitoring command from the first tool 60 and the arbitration process in the central GW 10 has not been ended, the controller 14 outputs an NRC to the transmission path 20 again similar to S310.

With the above-described configuration, the malfunction diagnosis requested by the first tool 60 at a later time is started after executing the malfunction diagnosis requested by the second tool 52 at a previous time. Thus, an increase of processing load in each ECU is avoided and a complication of the process in each ECU is avoided. Thus, a simultaneous execution of the malfunction diagnosis by both the first tool 60 and the second tool 52 can be properly avoided.

(Second Modification)

As described above, first come first processed configuration is defined under ISO 14229, which is the communication protocol of the application layer of CAN. Suppose that a diagnosis request frame is transmitted from a different diagnosis tool to an ECU at a later time while the ECU is receiving a diagnosis request frame from one diagnosis tool. In this case, the ECU may be configured to interrupt the process related to the previous diagnosis request frame and start the process related to the later diagnosis request frame in response to the receiving of the later diagnosis request frame according to a specific rule (after come first processed).

The following will describe an arbitration process for giving a higher priority to the malfunction diagnosis requested by the first tool 60 with reference to FIG. 6 when the ECU has an after come first processed configuration.

The second tool 52 outputs, to the third LAN 50, the FFD readout command that is destined to the first ECU 31 (S400). When the controller 14 of the central GW 10 receives the FFD readout command via the third communication portion 13, the controller 14 of the central GW 10 converts the ID of the FFD readout command, and outputs the FFD readout command having the converted ID to the first to third LANs 30 to 50 (S405).

When the first ECU 31 receives the FFD readout command, the first ECU 31 starts the diagnosis process corresponding to the FFD readout command (S410), and reads out the FFD stored in the non-volatile memory of the first ECU 31. When the FFD has a data size larger than 8 bytes, the FFD is divided into multiple data segments each of which having a data size less than 8 bytes.

Then, the first tool 60 outputs, to the transmission path 20, the data monitoring command destined to the first ECU 31 (S415). The controller 14 of the central GW 10 receives the data monitoring command that is output from the first tool 60 to the transmission path 20, and starts the arbitration process (S420) in order to give a higher priority to the malfunction diagnosis requested by the first tool 60. When the controller 14 of the central GW 10 starts the arbitration process, the controller 14 of the central GW 10 interrupts the relay of the diagnosis request frame from the second tool 52. Then, the controller 14 of the central GW 10 outputs the data monitoring command transmitted from the first tool 60 to the first to third LANs 30 to 50 (S425).

When the first ECU 31 receives the data monitoring command, the first ECU 31 interrupts the diagnosis process being executed in response to the received FFD readout command (thus, the first ECU does not output the FFD response). Then, the first ECU 31 starts the diagnosis process corresponding to the data monitoring command from the first tool 60 (S430), and reads out the data stored in the predetermined address of the memory, which is specified based on the data monitoring command. Then, the first ECU 31 generates an FF of data monitoring response so that the data monitoring response includes a part of the readout data. Then, the first ECU 31 outputs the data monitoring response to the first LAN 30 (S435). The controller 14 of the central GW 10 receives the data monitoring response that is output to the first LAN 30. At this time, the controller 14 is performing the arbitration process in order to interrupt the relay of the diagnosis request frame from the second tool 52. Thus, the controller 14 of the central GW 10 outputs the data monitoring response to the transmission path 20 (S440) without outputting the FFD response to the third LAN 50 to which the second tool 52 is connected.

The first tool 60 receives the data monitoring response and outputs a FC, to the transmission path 20, for instructing a transmission of the subsequent data monitoring response (S445). The controller 14 of the central GW 10 receives the FC via the fourth communication portion 15 and outputs the FC to the first to third LANs 30 to 50 (S450).

After S450, suppose that the second tool 52 outputs the FFD readout command that is destined to the first ECU 31 to the third LAN 50 (S455). The controller 14 of the central GW 10 receives the FFD read out command, but not relay the FFD readout command since the controller 14 of the central GW is performing the arbitration process.

When the first ECU 31 receives the FC that is transmitted from the central GW 10 at S450, the first ECU 31 generates a CF of data monitoring response so that the data monitoring response includes a part of non-transmitted data that has been previously read out, and outputs the data monitoring response to the first LAN 30 (S460). The controller 14 of the central GW 10 receives the data monitoring response via the first communication portion 11, and outputs the data monitoring response to the transmission path 20 (S465).

The first tool 60 receives the data monitoring response, and outputs, to the transmission path 20, an FC that instructs a transmission of the subsequent data monitoring response (S470). The controller 14 of the central GW 10 receives the FC via the fourth communication portion 15, and outputs the FC to the first to third LANs 30 to 50 (S475).

The first ECU 31 receives the FC, and generates a CF of data monitoring response so that the data monitoring response includes all of the non-transmitted data that has been previously read out, and outputs the data monitoring response to the first LAN 30 (S480). The controller 14 of the central GW 10 receives the data monitoring response via the first communication portion 11, and outputs the data monitoring response to the transmission path 20 (S485) in order to relay the data monitoring response to the first tool 60.

In the foregoing embodiment, when the malfunction diagnosis of the target ECU is requested by the second tool 52 during the malfunction diagnosis to the same ECU by the first tool 60, the malfunction diagnosis by the first tool 60 is interrupted in order to start the malfunction diagnosis requested by the second tool 52. In the present modification, suppose that each ECU has after come first processed configuration. Thus, with the central GW 10 according to the present modification, when each ECU has the after come first processed configuration, the malfunction diagnosis requested by the first tool 60 can be continued without interruption.

Thus, in the dealership utility, an execution of the malfunction diagnosis performed by the service tool can be secured without a delay. Further, an increase in processing load of each ECU and a complication of the processing can be avoided by properly arbitrating the malfunction diagnosis performed by multiple diagnosis tools.

(Other Embodiments)

In the foregoing embodiment, the first to third LANs 30 to 50 and the transmission path 20 are configured as CAN. Alternatively, communication protocols other than CAN may be used. For example, other communication protocols, such as event driven architecture, FlexRay, Media Orinted Systems Transport (MOST), Ethernet (registered trademark) may be used as in-vehicle LAN. With above-described other communication protocols, advantages similar to the above-described advantages can be provided.

According to the communication protocols of the first to third in-vehicle LANs 30 to 50 and the transmission path 20, the response to the command from the diagnosis purpose tool may be a message that includes multiple data frames, and single ID is set corresponding to the message (in other words, only one of the frames which configures the message has the ID instead of a configuration in which each frame that configures the message has the ID). In this case, the central GW 10, similar to the foregoing embodiment, may perform the relay of the message, conversion of the ID, and arbitration process to provide advantages similar to above-described advantages.

In the foregoing embodiment, the first tool 60 uses the diagnosis purpose frame defined under the communication protocol, and the second tool 52 uses the diagnosis purpose frame different from the diagnosis purpose frame defined under the communication protocol. However, the use of the diagnosis purpose frame is not limited to this configuration. Alternatively, the first tool 60 may use the diagnosis purpose frame different from the diagnosis purpose frame defined under the communication protocol, and the second tool 52 may use the diagnosis purpose frame defined under the communication protocol. With this configuration, advantages similar to the above-described advantages can be provided.

In the foregoing embodiment, the data link connector 21 is positioned in the transmission path 20, which is connected to the central GW 10. As another example, the data link connector may be positioned in any one of the first to third LANs 30 to 50. Further, multiple data link connectors may be positioned in the transmission path 20 or in the first to the third LANs 30 to 50, and multiple first tools 60 may be connected to respective data link connectors.

In the foregoing embodiment, a wireless communication with the center 70 is performed through one second tool 52 for performing the malfunction diagnosis of the ECU. As another example, the second tool 52 may perform wireless communication with multiple centers 70, and each center 70 may independently perform the malfunction diagnosis to the ECU.

As the ECUs that configure the on-board system, one or more wireless communication devices having similar functions with the second tool 52 may be disposed in the on-board system. The second tool 52 and the wireless communication device may perform the wireless communication with a different center 70 or a different terminal (mobile phone or smart phone) in order to perform the diagnosis requested by the center or the terminal. The malfunction diagnosis to the ECU can be independently carried out in each of the second tool 52 and the wireless communication devices.

The second tool 52 and above-described one or more wireless communication devices can be treated as one second tool unit. Alternatively, the second tool 52 and above-described one or more wireless communication devices can be treated independently as a third tool, a fourth tool, and so on.

As described above, when the malfunction diagnosis can be performed by one or more first tools 60, or by one or more different tools, advantages similar to above-described advantages can be provided.

In the present disclosure, central GW 10 corresponds to an example of a gateway device, the first tool 60 corresponds to an external connection tool, and the second tool 52 corresponds to a communication unit. Further, the first tool 60 corresponds to a first diagnosis purpose tool, and the second tool 52 corresponds to a second diagnosis purpose tool.

The diagnosis request frame, the FFD readout command, the FC, which are output from the second tool 52, correspond to target diagnosis requests. The NRC corresponds to a resending request. The ID corresponds to identification information. The IDs within a range from 0x000 to 0x6FF correspond to the first identification information and the fourth identification information. The IDs within a range from 0x700 to 0x7FF correspond to the second identification information and the third identification information. The conversion reference information that indicates a correspondence relation based on the same type and the same use purpose between each of the IDs (0x000 to 0x6FF) used in the second tool 52 and each of the IDs (0x700 to 0x7FF) used in the first tool 60 corresponds to request conversion reference information and the response conversion reference information.

The storage 16 of the central GW 10 corresponds to a request storage and a response storage. The third communication portion 13 and the fourth communication portion 15 correspond to a request receiving portion and a response transmitting portion. The first to third communication portions 11 to 13 correspond to a request transmitting portion and a response receiving portion.

A process executed at S105 in a relay of the diagnosis purpose frame corresponds to a request conversion portion, and a process executed at S125 corresponds to a response conversion portion. Processes executed at S165 and S175 correspond to a resending request portion.

The process executed at S225 in order to giving the higher priority to the malfunction diagnosis by the first tool 60 and the fourth communication portion 15 of the central GW 10 correspond to a delay portion, and the process executed at S220 corresponds to an arbitration portion.

The foregoing disclosure includes the following aspects.

According to an aspect of the present disclosure, a gateway device 10 includes a request receiving portion 13,15, a request storage 16, a request conversion portion S105, a request transmitting portion 11 to 13, a response receiving portion 11 to 13, a response storage 16, a response conversion portion S125, and a response transmitting portion 13,15. The request receiving portion 13, 15 receives, from a first diagnosis purpose tool 60, a diagnosis request that requests an execution of a malfunction diagnosis to an electronic control unit 31, 32, 41, 42, 51 equipped to a vehicle. The request receiving portion 13, 15 further receives, from a second diagnosis purpose tool 52, a target diagnosis request that requests an execution of a malfunction diagnosis to the electronic control unit 31, 32, 41, 42, 51. The target diagnosis request has a first identification information. The malfunction diagnosis requested by the target diagnosis request is identical to the malfunction diagnosis requested by the diagnosis request. The request storage 16 stores a request conversion reference information that indicates a correspondence relation between the first identification information and a second identification information. The second identification information is different from the first identification information. The request conversion portion S105 converts, based on the request conversion reference information, the first identification information, which is included in the target diagnosis request, to the corresponding second identification information. The request transmitting portion 11 to 13 transmits the diagnosis request received by the request receiving portion 13, 15 to an in-vehicle local area network 30, 40, 50 to which the electronic control unit 31, 32, 41, 42, 51 is connected, the request transmitting portion 11 to 13 further transmits the target diagnosis request to the in-vehicle local area network 30, 40, 50 after the request conversion portion S105 converts the first identification information to the second identification information. The response receiving portion 11 to 13 receives a diagnosis response, which output from the electronic control unit 31, 32, 41, 42, 51 to the in-vehicle local area network 30, 40, 50 as a response to the diagnosis request. The response storage 16 stores a third identification information. The third identification information is an identification information of a diagnosis response, which is a response to the target diagnosis request. The response storage 16 further stores a response conversion reference information that indicates a correspondence relation between the third identification information and a fourth identification information. The fourth identification information is different from the third identification information. The response conversion portion S125 converts, based on the response conversion reference information, the third identification information, which is included in the diagnosis response to the target diagnosis request, to the corresponding fourth identification information. The response transmitting portion 13, 15 transmits, to the first diagnosis purpose tool, the diagnosis response to the diagnosis request. The diagnosis response is received by the response receiving portion 11 to 13 and the first diagnosis purpose tool is a transmission source of the diagnosis request. The response transmitting portion 13, 15 further transmits, to the second diagnosis purpose tool, the diagnosis response to the target diagnosis request after the response conversion portion S125 converts the third identification information of the diagnosis response to the fourth identification information. The second diagnosis purpose tool is a transmission source of the target diagnosis request.

Each of the diagnosis request, the target diagnosis request, and the diagnosis response may be configured as single frame. Alternatively, each of the diagnosis request, the target diagnosis request, and the diagnosis response may be configured as single message including multiple frames. Herein, frame is a data that is transmitted in the in-vehicle LAN in one time transceiving of data.

The diagnosis request frame or the diagnosis request message that instructs a malfunction diagnosis to the ECU and the diagnosis response frame that is a response to the diagnosis request may have respective identification informations (ID) corresponding to the types and use purposes of the frame or the message.

In some cases, the values used for the identification information of the diagnosis purpose frame are defined under the communication protocol of the in-vehicle LAN, such as above-described communication protocol of the CAN defined under ISO.

When the gateway device 10 according to the present disclosure relays the diagnosis request frame having the non-prescribed identification information that are not defined under the communication protocol to the ECU, the gateway device 10 converts the identification information to the prescribed identification information that are defined under the communication protocol based on the request conversion reference information so that the converted prescribed identification information has the same frame type and the use purpose with the non-prescribed identification information. Further, when a diagnosis response frame having the prescribed identification information is received as a response to the diagnosis request frame having the converted identification information, the prescribed identification information is converted to the non-prescribed identification information indicating the same frame type and the same use purpose based on the conversion reference information. Then, diagnosis response frame is relayed to the diagnosis purpose tool.

With the above configuration, the malfunction diagnosis can be carried out using the frame having the non-prescribed identification information without adding a process, to each ECU, for handling the diagnosis request frame having the non-prescribed identification information or the diagnosis response frame having the non-prescribed identification information (in other words, a process for handling various different diagnosis purpose frames used in multiple diagnosis purpose tools). Thus, the diagnosis related process in each ECU can be simplified.

Further, types of the diagnosis purpose frames having the non-prescribed identification informations used in the malfunction diagnosis can be increased without changing a configuration of the ECU. Thus, when a new diagnosis tool is added or the current diagnosis purpose tool is changed, and accordingly, types of the diagnosis purpose frames increase, the non-prescribed identification information can be used with ease and a depletion of the prescribed identification information can be avoided.

As described above, according to the gateway device according to the present disclosure, the diagnosis related process in the ECU can be simplified and a depletion of the identification informations having the defined use purpose for the diagnosis purpose frame can be avoided.

The first identification information and the fourth identification information have use purposes other than malfunction uses that are defined under a communication protocol related to a communication performed by the electronic control unit 31, 32, 41, 42, 51 using the in-vehicle local area network 30, 40, 50. The second identification information and the third identification information have use purposes, which are defined as the malfunction uses under the communication protocol.

With this configuration, when the diagnosis purpose tool performs the malfunction diagnosis using the diagnosis purpose frame having the identification information that are not defined under the communication protocol of ECU, the diagnosis related process on the ECU side can be simplified.

When the number of types of the diagnosis purpose frames increase corresponding to an increase of the number of types of the diagnosis purpose tools and an increase of the number of the target ECUs to be diagnosed, the identification informations that are not defined under the communication protocol can be used with ease and a depletion of the identification informations that are defined under the communication protocol can be avoided.

The first diagnosis purpose tool 60 is provided by an external connection tool that temporarily connects with the gateway device via a transmission path 20. The second diagnosis purpose tool 52 is provided by a communication unit and is connected to the in-vehicle local area network 30, 40, 50, and the communication unit performs a communication with a center 70 positioned outside the vehicle or performs a communication with a different device positioned outside the vehicle. The request receiving portion 13, 15 receives the diagnosis request from the external connection tool via the transmission path 20 and receives the target diagnosis request from the communication unit via the in-vehicle local area network 30, 40, 50, the communication unit outputs the target diagnosis request to the in-vehicle local area network 30, 40, 50. The response transmitting portion 13, 15 transmits, to the external connection tool, the diagnosis response to the diagnosis request of the external connection tool via the transmission path, and transmits, to the communication unit, the diagnosis response to the target diagnosis request of the communication unit via the in-vehicle local area network 30, 40, 50. The diagnosis response to the diagnosis request of the external connection tool is generated by and transmitted from the electronic control unit 31, 32, 41, 42, 51, and the diagnosis response to the target diagnosis request of the communication unit is generated by and transmitted from the electronic control unit 31, 32, 41, 42, 51 and has the fourth identification information.

The gateway device 10 according to the present disclosure further includes a resending request portion S165, S175. When the request transmitting portion 11 to 13 transmits the diagnosis request from the first diagnosis purpose tool to the in-vehicle local area network 30, 40, 50 at a previous time, the request receiving portion 13,15 receives the target diagnosis request from the second diagnosis purpose tool 52 during a waiting period for the diagnosis response to the diagnosis request that is transmitted at the previous time, and the second identification information corresponding to the first identification information of the target diagnosis request is identical to the identification information of the diagnosis request previously transmitted by the request transmitting portion 11 to 13, the resending request portion S165, S175 transmits a resending request, which requests for a resending of the target diagnosis request after an elapse of a predetermined time period, to the second diagnosis purpose tool 52.

When the request transmitting portion 11 to 13 transmits the target diagnosis request from the second diagnosis purpose tool to the in-vehicle local area network 30, 40, 50 at a previous time, the request receiving portion 13,15 receives the diagnosis request from the first diagnosis purpose tool 60 during a waiting period for the diagnosis response to the target diagnosis request that is transmitted at the previous time, and the identification information of the diagnosis request is identical to the second identification information corresponding to the first identification information of the target diagnosis request previously transmitted by the request transmitting portion 11 to 13, the resending request portion S165, S175 transmits a resending request, which requests for a resending of the diagnosis request after an elapse of the predetermined time period, to the first diagnosis purpose tool 60.

The gateway device 10 according to the present disclosure further includes an arbitration portion S220 and a delay portion 15, S225. One of the first diagnosis purpose tool 60 and the second diagnosis purpose tool 52 is defined as a non-prioritized tool and a remaining one of the first diagnosis purpose tool 60 and the second diagnosis purpose tool 52 is defined as a prioritized tool. The prioritized tool has a priority higher than a priority of the non-prioritized tool. When the request receiving portion 13, 15 receives the diagnosis request from the non-prioritized tool for the execution of the malfunction diagnosis to the electronic control unit 31, 32, 41, 42, 51 at a previous time and receives the diagnosis request from the prioritized tool for the execution of the malfunction diagnosis to the electronic control unit 31, 32, 41, 42, 51 before an end of the malfunction diagnosis requested by the non-prioritized tool at the previous time, the arbitration portion S220 controls the request transmitting portion 11 to 13 to cancel an output of the diagnosis request, which is transmitted from the non-prioritized tool, and controls the response transmitting portion 13, 15 to cancel a transmission of the diagnosis response to the non-prioritized tool. When the request receiving portion 13, 15 receives the diagnosis request from the non-prioritized tool for the execution of the malfunction diagnosis to the electronic control unit 31, 32, 41, 42, 51 at a previous time and receives the diagnosis request from the prioritized tool for the execution of the malfunction diagnosis to the electronic control unit 31, 32, 41, 42, 51 before the end of the malfunction diagnosis requested by the non-prioritized tool at the previous time, the delay portion 15, S225 transmits, to the prioritized tool, a resending request that requests for a resending of the diagnosis request after an elapse of a predetermined time period. In this case, the diagnosis request is one of the diagnosis request transmitted from the first diagnosis purpose tool 60 or the target diagnosis request transmitted from the second diagnosis purpose tool 52.

Specifically, suppose a case that the first diagnosis purpose tool 60 has a priority higher than a priority of the second diagnosis purpose tool 52. In this case, when the request receiving portion 13, 15 receives the target diagnosis request from the second diagnosis purpose tool 52 for the execution of the malfunction diagnosis to the electronic control unit 31, 32, 41, 42, 51 at a previous time and receives the diagnosis request from the first diagnosis purpose tool 60 for the execution of the malfunction diagnosis to the electronic control unit 31, 32, 41, 42, 51 before an end of the malfunction diagnosis requested by the second diagnosis purpose tool 52 at the previous time, the arbitration portion S220 controls the request transmitting portion 11 to 13 to cancel an output of the target diagnosis request, which is transmitted from the second diagnosis purpose tool 52, and controls the response transmitting portion 13, 15 to cancel a transmission of the diagnosis response to the second diagnosis purpose tool 52. When the request receiving portion 13, 15 receives the target diagnosis request from the second diagnosis purpose tool 52 for the execution of the malfunction diagnosis to the electronic control unit 31, 32, 41, 42, 51 at a previous time and receives the diagnosis request from the first diagnosis purpose tool 60 for the execution of the malfunction diagnosis to the electronic control unit 31, 32, 41, 42, 51 before the end of the malfunction diagnosis requested by the second diagnosis purpose tool 52 at the previous time, the delay portion 15, S225 transmits, to the first diagnosis purpose tool 60, a resending request that requests for a resending of the diagnosis request after an elapse of a predetermined time period.

Suppose a case that the second diagnosis purpose tool 52 has a priority higher than a priority of the first diagnosis purpose tool 60. In this case, when the request receiving portion 13, 15 receives the diagnosis request from the first diagnosis purpose tool 60 for the execution of the malfunction diagnosis to the electronic control unit 31, 32, 41, 42, 51 at a previous time and receives the target diagnosis request from the second diagnosis purpose tool 52 for the execution of the malfunction diagnosis to the electronic control unit 31, 32, 41, 42, 51 before an end of the malfunction diagnosis requested by the first diagnosis purpose tool 60 at the previous time, the arbitration portion S220 controls the request transmitting portion 11 to 13 to cancel an output of the diagnosis request, which is transmitted from the first diagnosis purpose tool 60, and controls the response transmitting portion 13, 15 to cancel a transmission of the diagnosis response to the first diagnosis purpose tool 60. When the request receiving portion 13, 15 receives the diagnosis request from the first diagnosis purpose tool 60 for the execution of the malfunction diagnosis to the electronic control unit 31, 32, 41, 42, 51 at a previous time and receives the target diagnosis request from the second diagnosis purpose tool 52 for the execution of the malfunction diagnosis to the electronic control unit 31, 32, 41, 42, 51 before the end of the malfunction diagnosis requested by the first diagnosis purpose tool 60 at the previous time, the delay portion 15, S225 transmits, to the second diagnosis purpose tool 52, a resending request that requests for a resending of the target diagnosis request after an elapse of the predetermined time period.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A gateway device comprising:
    a request receiving portion receiving, from a first diagnosis purpose tool, a diagnosis request that requests an execution of a malfunction diagnosis to an electronic control unit equipped to a vehicle, the request receiving portion further receiving, from a second diagnosis purpose tool, a target diagnosis request that requests an execution of a malfunction diagnosis to the electronic control unit, the target diagnosis request having a first identification information, the malfunction diagnosis requested by the target diagnosis request being identical to the malfunction diagnosis requested by the diagnosis request;
    a request storage storing a request conversion reference information that indicates a correspondence relation between the first identification information and a second identification information, the second identification information being different from the first identification information;
    a request conversion portion converting, based on the request conversion reference information, the first identification information, which is included in the target diagnosis request, to the corresponding second identification information;
    a request transmitting portion transmitting the diagnosis request received by the request receiving portion to an in-vehicle local area network to which the electronic control unit is connected, the request transmitting portion further transmitting the target diagnosis request to the in-vehicle local area network after the request conversion portion converts the first identification information to the second identification information;
    a response receiving portion receiving a diagnosis response, the diagnosis response being output from the electronic control unit to the in-vehicle local area network as a response to the diagnosis request;
    a response storage storing a third identification information, the third identification information being an identification information of a diagnosis response, which is a response to the target diagnosis request, the response storage further storing a response conversion reference information that indicates a correspondence relation between the third identification information and a fourth identification information, the fourth identification information being different from the third identification information;
    a response conversion portion converting, based on the response conversion reference information, the third identification information, which is included in the diagnosis response to the target diagnosis request, to the corresponding fourth identification information; and
    a response transmitting portion transmitting, to the first diagnosis purpose tool, the diagnosis response to the diagnosis request, the diagnosis response being received by the response receiving portion and the first diagnosis purpose tool being a transmission source of the diagnosis request, the response transmitting portion further transmitting, to the second diagnosis purpose tool, the diagnosis response to the target diagnosis request after the response conversion portion converts the third identification information of the diagnosis response to the fourth identification information, the second diagnosis purpose tool being a transmission source of the target diagnosis request.

2. The gateway device according to claim 1, wherein
    the first identification information and the fourth identification information have use purposes other than malfunction uses that are defined under a communication protocol related to a communication performed by the electronic control unit using the in-vehicle local area network, and
    the second identification information and the third identification information have use purposes, which are defined as the malfunction uses under the communication protocol.

3. The gateway device according to claim 1, wherein
    the first diagnosis purpose tool is provided by an external connection tool that temporarily connects with the gateway device via a transmission path,
    the second diagnosis purpose tool is provided by a communication unit and is connected to the in-vehicle local area network, the communication unit performs a communication with a center positioned outside the vehicle or performs a communication with a different device positioned outside the vehicle,
    the request receiving portion receives the diagnosis request from the external connection tool via the transmission path and receives the target diagnosis request from the communication unit via the in-vehicle local area network, the communication unit outputs the target diagnosis request to the in-vehicle local area network,
    the response transmitting portion transmits, to the external connection tool, the diagnosis response to the diagnosis request of the external connection tool via the transmission path, and transmits, to the communication unit, the diagnosis response to the target diagnosis request of the communication unit via the in-vehicle local area network, and
    the diagnosis response to the diagnosis request of the external connection tool is generated by and transmitted from the electronic control unit, and the diagnosis response to the target diagnosis request of the communication unit is generated by and transmitted from the electronic control unit and has the fourth identification information.

4. The gateway device according to claim 1, further comprising
    a resending request portion, wherein,
    when the request transmitting portion transmits the diagnosis request from the first diagnosis purpose tool to the in-vehicle local area network at a previous time, the request receiving portion receives the target diagnosis request from the second diagnosis purpose tool during a waiting period for the diagnosis response to the diagnosis request that is transmitted at the previous time, and the second identification information corresponding to the first identification information of the target diagnosis request is identical to the identification information of the diagnosis request previously transmitted by the request transmitting portion, the resending request portion transmits a resending request, which requests for a resending of the target diagnosis request after an elapse of a predetermined time period, to the second diagnosis purpose tool.

5. The gateway device according to claim 4, wherein, when the request transmitting portion transmits the target diagnosis request from the second diagnosis purpose tool to the in-vehicle local area network at a previous time, the request receiving portion receives the diagnosis request from the first diagnosis purpose tool during awaiting period for the diagnosis response to the target diagnosis request that is transmitted at the previous time, and the identification information of the diagnosis request is identical to the second identification information corresponding to the first identification information of the target diagnosis request previously transmitted by the request transmitting portion, the resending request portion transmits a resending request, which requests for a resending of the diagnosis request after an elapse of the predetermined time period, to the first diagnosis purpose tool.

6. The gateway device according to claim 1, further comprising:
an arbitration portion; and
a delay portion, wherein
one of the first diagnosis purpose tool and the second diagnosis purpose tool is defined as a non-prioritized tool and a remaining one of the first diagnosis purpose tool and the second diagnosis purpose tool is defined as a prioritized tool,
the prioritized tool has a priority higher than a priority of the non-prioritized tool,
when the request receiving portion receives the diagnosis request from the non-prioritized tool for the execution of the malfunction diagnosis to the electronic control unit at a previous time and receives the diagnosis request from the prioritized tool for the execution of the malfunction diagnosis to the electronic control unit before an end of the malfunction diagnosis requested by the non-prioritized tool at the previous time, the arbitration portion controls the request transmitting portion to cancel an output of the diagnosis request, which is transmitted from the non-prioritized tool, and controls the response transmitting portion to cancel a transmission of the diagnosis response to the non-prioritized tool, and
when the, request receiving portion receives the diagnosis request from the non-prioritized tool for the execution of the malfunction diagnosis to the electronic control unit at a previous time and receives the diagnosis request from the prioritized tool for the execution of the malfunction diagnosis to the electronic control unit before the end of the malfunction diagnosis requested by the non-prioritized tool at the previous time, the delay portion transmits, to the prioritized tool, a resending request that requests for a resending of the diagnosis request after an elapse of a predetermined time period.

7. The gateway device according to claim 6, wherein the prioritized tool is provided by an external connection tool, and
the non-prioritized tool is provided by a communication unit.

8. The gateway device according to claim 6, wherein the prioritized tool is provided by a communication unit, and the non-prioritized tool is provided by an external connection tool.

9. The gateway device according to claim 1, further comprising:
an arbitration portion; and
a delay portion, wherein,
in a case where the first diagnosis purpose tool has a priority higher than a priority of the second diagnosis purpose tool,
when the request receiving portion receives the target diagnosis request from the second diagnosis purpose tool for the execution of the malfunction diagnosis to the electronic control unit at a previous time and receives the diagnosis request from the first diagnosis purpose tool for the execution of the malfunction diagnosis to the electronic control unit before an end of the malfunction diagnosis requested by the second diagnosis purpose tool at the previous time, the arbitration portion controls the request transmitting portion to cancel an output of the target diagnosis request, which is transmitted from the second diagnosis purpose tool, and controls the response transmitting portion to cancel a transmission of the diagnosis response to the second diagnosis purpose tool, and
when the request receiving portion receives the target diagnosis request from the second diagnosis purpose tool for the execution of the malfunction diagnosis to the electronic control unit at a previous time and receives the diagnosis request from the first diagnosis purpose tool for the execution of the malfunction diagnosis to the electronic control unit before the end of the malfunction diagnosis requested by the second diagnosis purpose tool at the previous time, the delay portion transmits, to the first diagnosis purpose tool, a resending request that requests for a resending of the diagnosis request after an elapse of a predetermined time period.

10. The gateway device according to claim 9, wherein, in a case where the second diagnosis purpose tool has a priority higher than a priority of the first diagnosis purpose tool,
when the request receiving portion receives the diagnosis request from the first diagnosis purpose tool for the execution of the malfunction diagnosis to the electronic control unit at a previous time and receives the target diagnosis request from the second diagnosis purpose tool for the execution of the malfunction diagnosis to the electronic control unit before an end of the malfunction diagnosis requested by the first diagnosis purpose tool at the previous time, the arbitration portion controls the request transmitting portion to cancel an output of the diagnosis request, which is transmitted from the first diagnosis purpose tool, and controls the response transmitting portion to cancel a transmission of the diagnosis response to the first diagnosis purpose tool, and
when the request receiving portion receives the diagnosis request from the first diagnosis purpose tool for the execution of the malfunction diagnosis to the electronic control unit at a previous time and receives the target diagnosis request from the second diagnosis purpose tool for the execution of the malfunction diagnosis to the electronic control unit before the end of the malfunction diagnosis requested by the first diagnosis purpose tool at the previous time, the delay portion transmits, to the second diagnosis purpose tool, a resending request that requests for a resending of the target diagnosis request after an elapse of the predetermined time period.

* * * * *